March 29, 1955 V. L. FRANTZ 2,705,020
FLUID PRESSURE ACTUATED CONTROL VALVE
Filed Oct. 26, 1950 2 Sheets-Sheet 1

*INVENTOR*
VIRGIL L. FRANTZ,

BY

*his* ATTORNEY

March 29, 1955 V. L. FRANTZ 2,705,020
FLUID PRESSURE ACTUATED CONTROL VALVE
Filed Oct. 26, 1950 2 Sheets-Sheet 2

Inventor
VIRGIL L. FRANTZ,
By Ernest J. Macklin
Attorney

United States Patent Office 2,705,020
Patented Mar. 29, 1955

2,705,020

FLUID PRESSURE ACTUATED CONTROL VALVE

Virgil L. Frantz, Salem, Va.

Application October 26, 1950, Serial No. 192,287

5 Claims. (Cl. 137—620)

This invention relates to fluid pressure systems, such as used in sanding and like operations, and more particularly to controls therefor.

An object of the invention is to provide an automatically bleeding fluid pressure actuated control valve.

A further object of the invention is to provide an improved fluid pressure actuated control valve in which the forces exerted on its valve member by fluid flowing through the valve are in balance.

Another object of the invention is to provide a fluid pressure actuated control valve in which the valve-operating force is required to overcome only the force by which the valve is normally closed.

A further object of the invention is to provide a fluid pressure actuated control valve of the differential piston type, wherein the fluid pressure which the valve controls is utilized to operate the valve.

Other objects and advantages of the invention will appear hereinafter in the detailed description, be particularly pointed out in the appended claims and illustrated in the accompanying drawings, in which:

Figure 1:
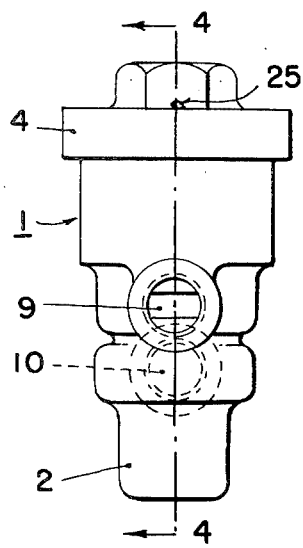
Figure 1 is a side elevational view of a preferred embodiment of the valve of the present invention.

Referring now in detail to the drawings in which like reference characters designate like parts and considering, first, the embodiment of the control valve illustrated in Figures 1 through 4, this valve is comprised of a housing, body or casing 1 which is preferably substantially cylindrical in outline, but of varying diameter along its length. The housing preferably is cloesd at its lower end 2 and open at its upper end 3, the latter normally being closed by a screw-threaded cap, cover or closure member 4.

The housing 1 is hollow and provided, adjacent its upper end 3, with an enlarged, substantially cylindrical chamber or recess 5. Connected or communicating with the lower end of this chamber and extending therefrom to the cloesd, lower end 2 of the housing is an axial, preferably cylindrical, bore 6 of uniform cross-section. Communicating with this bore through upper and lower annular recesses 7 and 8, respectively, interrupting the side wall thereof, are correspondingly spaced, substantially radially disposed outlet and inlet ports or openings 9 and 10, respectively, which may be internally threaded to connect the outlet port to the mechanism whose operation the valve is to control, and the inlet port to a reservoir or other source of fluid pressure.

Slidable or reciprocable within the bore 6 and projecting therebeyond into the enlarged chamber 5 is a piston or valve or closure member 11, the main or body portion 12 of which is cylindrical and adapted closely to fit the bore. Integral with the body portion 12 of the piston and forming part of the upper end or head thereof is a peripheral flange 13, which slidably fits the side wall of the chamber 5. For maintaining the upper end of the flange normally against the underside of the cap, there may be utilized resilient or yieldable means in the form of a coil spring 14 encircling the body of the piston and acting between the lower end of the chamber 5 and the underside of the flange 13, the flange here being undercut to partially contain the spring when the latter is closed and thereby increase the maximum stroke of the piston.

Disposed substantially centrally, longitudinally or axially of the piston 11, is a fluid passage, conduit or cavity 15 connected to the exterior of the piston through a pair of axially spaced upper and lower sets or groups of circumferentially spaced, radially disposed ports or leads, the upper and lower sets being numbered 16 and 17, respectively. The axial spacing between these sets of ports is such that they normally connect the passage 15 with the chamber 5 and the upper annular recess 7 of the outlet port 9, while, when the spring 14 is compressed, they provide a fluid connection between the inlet and outlet ports, 10 and 9, through the passage.

It will be noted that the axial passage 15 projects or extends somewhat beyond the lower set 17 of ports toward the lower end of the piston. The passage extends in like manner above the upper set 16 of ports and is connected thereabove through a coaxial, threaded opening 18 having a free cross-section equal to that of the passage and extending from the passage through to the upper end of the piston. This threaded opening not only provides access to the interior of the piston for boring or drilling of the passage, but, by normally closing the opening by an externally threaded plug 19, the passage is provided with closures at either end of equal cross-section. The plug 19 is made short relative to the length of the tapped or threaded opening 18 to enable the latter to accommodate a puller (not shown) above the plug by screwing down the latter, to facilitate withdrawal of the piston from the casing 1 for servicing or other purposes.

To concentrate the flow of fluid through the passage 15 and prevent it from leaking around the exterior of the piston, the upper annular recess 7 of the outlet port 9 is straddled by a pair of rubber ring or like sealing gaskets 20, inset in the wall of the axial bore 6 and wiping against the confronting wall of the piston. Like leakage is prevented between the inlet port 10 and the lower end 2 of the casing, and around the flange 13, by similar gaskets 21 and 22, respectively, inset in the piston 11, the lower end portion of the latter and its flange 13 being peripherally grooved for this purpose.

While the control valve may be operated manually or by a solenoid or other suitable means for moving the piston 11 against the force of the return spring 14, the illustrated embodiment of the invention is designed to be actuated by fluid pressure from the usual compressed air or other fluid pressure cylinder or vessel (not shown), which may be mounted above the valve and adapted to exert pressure against the head of the piston 11 through an access opening 23 formed in the cover 4. Directly below this opening, the cover is recessed to form an annular space 24 intermediate the head of the piston and the cover, and spacing the central portions of these members when they are in engagement. This space is, in turn, connected to atmospheric pressure by a bleed 25 which is shown as extending diagonally through the cap. Below the flange 13, at the lower end of the chamber 5, the casing 1 is pierced by a plurality of bleeds 26, relatively larger than the cover bleed 25. Similarly, an atmospheric bleed 27 extends through the lower, otherwise closed, end 2 of the casing in line with the piston 11.

With the above construction, application of fluid pressure to the head of the piston 11 through the opening 23 from the actuating cylinder displaces the piston against the force of the spring 14 until the piston, at the limit of its movement, attains its open position and affords access from the inlet port 10 to the outlet port 9 through the fluid passage 15 and its sets of ports, 16 and 17. Entrance of the controlled fluid from the inlet port during movement of the piston being prevented by the associated sealing rings, and the confronting wall of the piston being of uniform or smooth configuration, this fluid pressure offers no resistance to movement of the piston. A like lack of resistance is afforded by air between the lower ends of the piston and casing, since any air which would otherwise be entrapped is expelled or forced out through the atmospheric bleed 27. The intermediate bleeds 26 at the lower end of the chamber 5 perform the same function for air contained between the flange 13 and the lower end of the chamber. Consequently, in movement of the piston from closed to open position, the only force that need be overcome, other than the relatively negligible frictional resistance, is that of the spring 14.

When the piston is in its open position, permitting fluid to flow from the inlet to the outlet port through the central passage 15, the fluid exerts an axial component of force in the direction of its flow against the lower face of the plug 19 closing the upper end of the passage. At the same time, the fluid also exerts an axial component of force against the opposite or lower, closed end of the chamber. This end and the opposing face of the plug being of the same cross-sectional area, the axial components of the fluid are in balance and have no effect upon the piston. When the control valve is shut off by cutting off the flow of air or other fluid from the actuating cylinder, the piston is moved to closed position by the spring 14, any air entrapped between the head of the piston and the cover 4 being bled or released through the bleed 25 which, while of adequate cross-section for such bleeding, is of insufficient size appreciably to decrease the force of the actuating fluid during application of the latter. As the piston reaches its closed position, the upper and lower sets of ports, 16 and 17, provide a conduit between the outlet line and the upper chamber 7 through which any air in the outlet line is bled quickly, via the intermediate bleeds 26, again without effect upon the piston due to the balancing of axial forces of the fluid. Accordingly, the particular construction of the valve not only eliminates as factors any pressures other than the actuating pressure and the force of the return spring, but also provides means whereby any compressed air or other fluid in the outlet line is dumped or bled to the atmosphere immediately on closing of the valve, thereby preventing protracted operation of the mechanism which the control valve controls.

Figure 4:
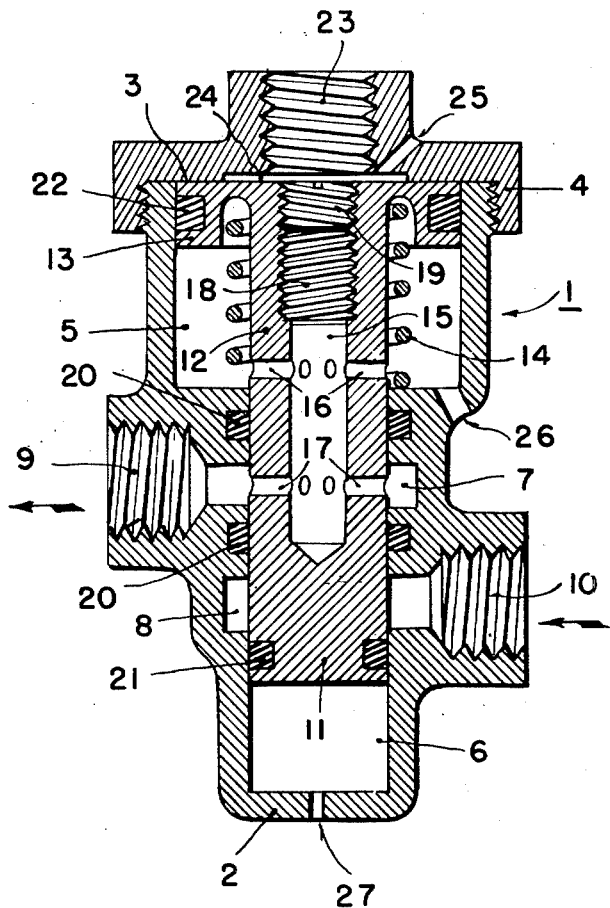
Figure 4 is a vertical sectional view, taken along the lines 4—4 of Figure 1.
Figure 2:
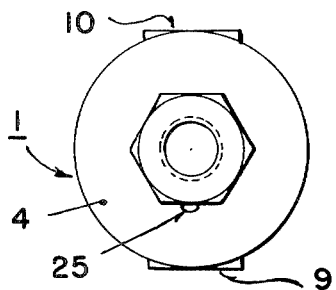
Figure 2 is a top plan view of the valve of Figure 1.
Figure 3:
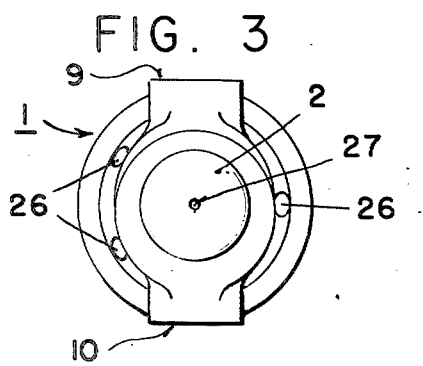
Figure 3 is a bottom plan view of the valve.
Figure 5:
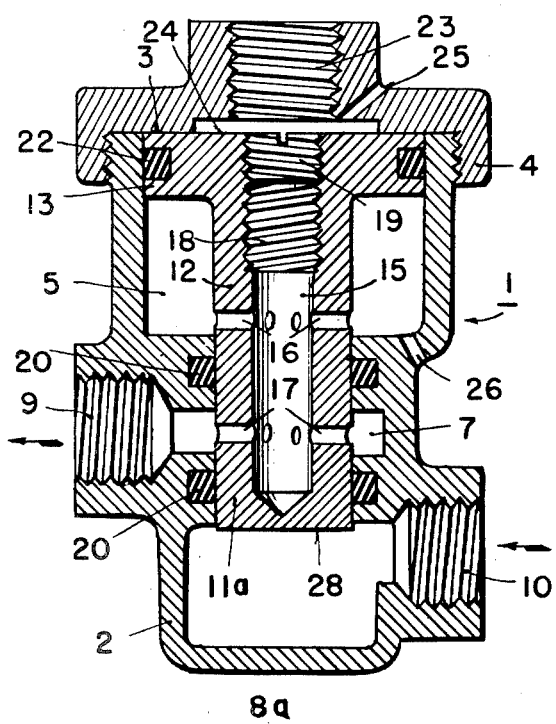
Figure 5 is a vertical sectional view of a modified form of the valve of Figure 4.

Referring now to the control valve of Figure 5, this valve is, in most respects, identical with the valve of Figure 4 and, to avoid repetition in description, its components have been numbered the same as those of the preceding figure, except where they differ. The difference between the valves of the two figures lies primarily in utilizing fluid pressure normally to hold the valve closed, in the valve of Figure 5, in lieu of the return spring 14 of the valve of Figure 4. This is here accomplished by shortening the valve member or piston, here designated as 11a, and extending the annular recess 8a, of the inlet port 10, such that the lower end 28 of the valve member is always exposed to pressure from the supply tank or other fluid pressure source (not shown), to which the inlet port 10 is connected. At the same time, the bleed port 27 in the lower end of the valve body of Figure 4 is eliminated, thus enabling the fluid pressure, to which the annular recess 8a is always open, constantly to apply an axial force on the valve member 11a in the closing direction of the latter. Having the same relatively larger upper end as the valve member 11, this provided by the body portion 12 and the integral peripheral flange 13, the valve member 11a serves as a differential piston by which, if the pressures at opposite ends of the valve member are substantially equal, the resultant greater force on the upper end of the valve member will force the latter open. Consequently, the control valve of this figure, while retaining the features of the valve of Figure 4 by which the axial components of the force exerted by fluid passing through the valve on the valve member are in balance, will be enabled normally to be held closed by the supply pressure without use of a spring.

Figure 6:
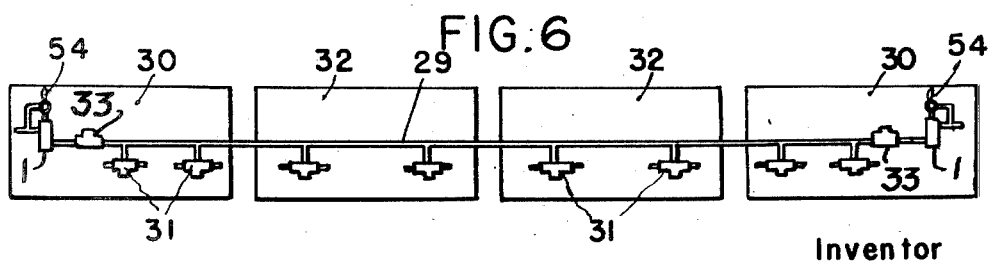
Figure 6 is a schematic view of a pressure line showing the exhaustion of the control and check valves.

A typical application of the control valves of the present invention is that of Figure 6 which is exemplary of the sanding system of multi-unit motive power assemblies, such as the multi-unit diesel engines of the railway art. In the application there shown, an extended pressure line 29 is adapted to be operated from either of the end units 30, in turn to cause operation of the sanding or other operating valves 31 of both the end units and the intermediate units 32. A suitable sanding valve for this purpose is that of my co-pending application Serial No. 722,383, filed January 16, 1947, now Patent No. 2,589,794.

In the arrangement of Figure 6, the control valves are positioned at either end of the pressure line with their outlet ports 9 confronting. Were only the control valves present, it is obvious that each would bleed, through its bleed port 26, any fluid introduced into the line by the other valve. Accordingly, it is necessary that there be positioned, between each control valve and both the operating valves 31 and the opposite control valve, a check or one-way valve 33. However, a conventional check valve, while effectively preventing bleeding through the adjacent or the associated control valve on charging of the line by the other valve, would close too quickly for its associated control valve to bleed the line, when the latter valve was used as the charging valve. The check valve 33 employed in the illustrated arrangement, with either form of the control valve, is, therefore, a delayed action check valve, such as shown in my co-pending application Serial No. 192,288, filed October 26, 1950, which is retarded in closing so as to bleed back air in the line through the associated control valve and acts as a conventional check valve to prevent loss of pressure when the line is charged by the remote control valve.

From the above detailed description, it will be apparent that there has been provided a fluid pressure actuated control valve in which the fluid pressure forces are in balance and which bleeds automatically when closed. It should be understood that the described and disclosed embodiments are merely exemplary of the invention and that all modifications are intended to be included which do not depart either from the spirit of the invention or the scope of the appended claims.

Having described my invention, I claim:

1. A fluid pressure actuated control valve comprising a valve body having a bore, a piston shiftable in said bore and having a central passage, an access opening in said body leading to an end of said piston, spaced inlet, outlet and bleed ports in said body and connected to said bore, said outlet port being alternately connectable to said inlet and bleed ports through said passage on shifting of said piston, and means acting on said piston for normally maintaining it in position to connect said outlet and bleed ports, said piston on application of fluid pressure to said end through said access opening shifting to connect said outlet and inlet ports.

2. A fluid pressure actuated control valve comprising a casing having a bore and a chamber connected thereto, spaced inlet and outlet ports connected to said bore, spaced bleed and access ports connected to said chamber, a piston in and shiftable axially of said bore, said piston having a central passage and spaced openings thereto for alternately connecting said outlet port to said inlet and bleed ports on shifting thereof, a head on said piston slidable in said chamber between said access and bleed ports, and means acting on said piston for normally maintaining it in position to connect said outlet and bleed ports, said piston on application of fluid pressure against said head through said access port shifting to connect said outlet and inlet ports.

3. A fluid pressure actuated control valve comprising a casing having a bore and a chamber connected thereto, spaced inlet and outlet ports connected to said bore, spaced bleed and access ports connected to said chamber, a piston in and shiftable axially of said bore, said piston having a central passage and spaced openings thereto for alternately connecting said outlet port to said inlet and bleed ports on shifting thereof, a head on said piston slidable in said chamber between said access and bleed ports, and spring means acting on said piston for normally maintaining it in position to connect said outlet and bleed ports, said piston on application of fluid pressure against said head through said access port shifting to connect said outlet and inlet ports.

4. A fluid pressure actuated control valve comprising a valve body having a bore, spaced inlet, outlet, bleed and access ports connected to said bore, a piston in said bore and having a substantially axial passage connectable exteriorly of said piston through spaced transverse openings, said passage having axially opposed surfaces of substantially equal cross-section, said piston having ends of different area, a larger of said ends being exposed to said access port and said other end being exposed to said inlet port, said piston being shiftable alternately to connect said outlet port to said bleed and inlet ports, and said piston normally being maintained by pressure from said inlet port in position to connect said outlet and bleed ports and being shiftable to connect said outlet and inlet ports on application of substantially the same pressure to said access port.

5. A fluid pressure actuated control valve comprising a valve body having a chamber and a restricted bore connected thereto, spaced access and bleed ports connected to said chamber and spaced inlet and outlet ports connected to said bore, a piston in said bore and having an enlarged head in said chamber between said access and bleed ports, and a passage in said piston and having opposed surfaces of substantially equal area, said piston being shiftable alternately to connect said outlet port to said inlet and bleed ports, and said piston normally being held in closed position connecting said outlet and bleed ports by application of line pressure to an end thereof opposite said head and shifting to open position connecting said outlet and inlet ports on application of substantially the same pressure to said access port, said bleed port on shifting of said piston bleeding said chamber to prevent back pressure on said head.

References Cited in the file of this patent

UNITED STATES PATENTS

| Number | Name | Date |
|---|---|---|
| 58,179 | Saville | Sept. 18, 1866 |
| 323,404 | Durfee | Aug. 4, 1885 |
| 461,981 | Miles | Oct. 27, 1891 |
| 1,156,532 | Kieser | Oct. 12, 1915 |
| 1,751,061 | Ter Beest | Mar. 18, 1930 |
| 1,849,702 | Bard | Mar. 15, 1932 |
| 1,914,645 | Power et al. | June 20, 1933 |
| 2,020,773 | Ernst | Nov. 12, 1935 |
| 2,059,808 | Robert et al. | Nov. 3, 1936 |
| 2,132,030 | Hunt et al. | Oct. 4, 1938 |
| 2,165,267 | Hughes | July 11, 1939 |
| 2,213,785 | Larson et al. | Sept. 3, 1940 |
| 2,320,905 | Bateholts | June 1, 1943 |
| 2,396,653 | Hermanny | Mar. 19, 1946 |